Aug. 9, 1966 W. R. LETHIN 3,265,876

PARALLEL DATA ACCUMULATOR FOR OPERATING IN EITHER A BINARY OR DECIMAL MODE

Filed Dec. 24, 1962 7 Sheets-Sheet 1

INVENTOR.
WALTER R. LETHIN
BY Henry L. Hanson
ATTORNEY

INVENTOR.
WALTER R. LETHIN
BY Henry L. Hanson
ATTORNEY

INVENTOR.
WALTER R. LETHIN
BY Henry L. Hanson
ATTORNEY

INVENTOR.
WALTER R. LETHIN
BY Henry L. Hanson
ATTORNEY

INVENTOR.
WALTER R. LETHIN
BY Henry L. Hanson
ATTORNEY

INVENTOR.
WALTER R. LETHIN
BY Henry L. Hanson
ATTORNEY

Aug. 9, 1966 W. R. LETHIN 3,265,876
PARALLEL DATA ACCUMULATOR FOR OPERATING IN
EITHER A BINARY OR DECIMAL MODE
Filed Dec. 24, 1962 7 Sheets-Sheet 7

INVENTOR.
WALTER R. LETHIN
BY Henry L. Hanson
ATTORNEY

United States Patent Office 3,265,876
Patented August 9, 1966

3,265,876

PARALLEL DATA ACCUMULATOR FOR OPERATING IN EITHER A BINARY OR DECIMAL MODE

Walter R. Lethin, Canton, Mass., assignor to Honeywell Inc., a corporation of Delaware Filed Dec. 24, 1962, Ser. No. 246,758
12 Claims. (Cl. 235—173)

This invention relates generally to new and improved information processing apparatus. More particularly, this invention is concerned with a new and improved data-accumulator apparatus which is characterized by its ability to provide arithmetic functions, such as addition and subtraction, in a parallel manner and with carry anticipation and generation in both the binary and decimal mode of operation.

In data processing machines, such as electrical computers and the like, the information handled frequently is electronically represented in binary form due to the ease with which binary data may be electronically represented by "on-off" or "dot-dash" representations. In some types of data processing machines, the information handled is solely in binary form, in other types, the information handle is solely in decimal form, while in still other types, as in the present case, the information may selectively be handled in either binary or decimal form, as desired.

Those skilled in the art further will appreciate that in certain types of electrical computers, the addition and subtraction operations are handled in parallel; i.e., the bits of both operands enter the accumulator at the same time, and the bits of the result are formed simultaneously. In parallel addition, for example, the bits of the operands to be added are sent to the adder such that the lower order bits are processed at the same time that the higher order bits are processed. This necessitates the use of auxiliary functions responsible for the anticipation of any lower order carries before they actually occur. Each of the higher order functions must be given the opportunity to sample all possible combinations of lower order bits prior to the determination of the result.

Such anticipation and generation of the carries is a fundamental problem of parallel addition and subtraction. Those skilled in the art appreciate that the entire carry operation including the anticipatory action is a still greater problem in computing apparatus adapted for both binary and decimal operation.

Accordingly, it is a general object of this invention to provide a new and improved data accumulator apparatus adapted for parallel operation and having provision for carry anticipation and generation.

It is another object of this invention to provide such a new improved parallel operation data accumulator apparatus which provides a carry anticipation and generation function in both the binary and decimal mode of operation.

It is still another object of this invention to provide a unique parallel operation data accumulator apparatus having carry anticipation and generation features and capable of addition and subtraction arithmetic functions, in either a binary or decimal mode of operation.

It is a further object of this invention to provide such a parallel operation data accumulator, as above, which is adapted to always perform an addition operation, even when directed to subtract, wherein one of the two operands is complemented and a free one bit is inserted into the low order position of the accumulator. In those instances, where this does not result in a proper answer, usually where there are unlike signs in the operands, the accumulator repeats the operation but no complementing of one of the input operands takes place and no free one bit is inserted.

It is a still further object of this invention to provide a novel parallel operation data accumulator having carry anticipation and generation features and capable of binary or decimal operation which is characterized by its high degree of programming capability coupled with the achievement of advantageous engineering economy.

The novel features which are characteristic of the invention are set forth with particularity in the appended claims. The invention itself, however, both as to its organization and method of operation, together with further objects and advantages thereof, will best be understood by reference to the following description taken in conjunction with the accompanying drawing in which:

FIGURE 8 is a diagrammatic showing of the DECIMAL GENERATION CARRY FUNCTION circuit elements utilized for one four bit group of the accumulator of FIGURE 2;

The present invention will be disclosed hereinbelow with reference to the accompanying drawings in which there is shown a representative data processing apparatus embodying the present invention. While the representative data processing apparatus may take on any one of a number of different forms, for purposes of illustration the invention will be disclosed as embodied in an electronic computing apparatus of the type adapted to transfer information data in the form of a plurality of encoded signals or bits from a suitable storage register to an arithmetic accumulator. This transfer is effected in a parallel manner, i.e., with the bits of the two operands to be processed being transferred simultaneously from the storage register to be accumulator portion of the computer.

In order to facilitate the explanation of the invention given hereinbelow, it will be assumed that the date processing apparatus is of an exemplary type wherein each information word is comprised of forty-eight bits, with each forty-eight bit word being treated as two twenty-four bit words. It, however, is obvious to those skilled in the art that the principles of this invention are in no way limited to this specific example and that a large variety of machine word types also may be utilized.

Figure 1:
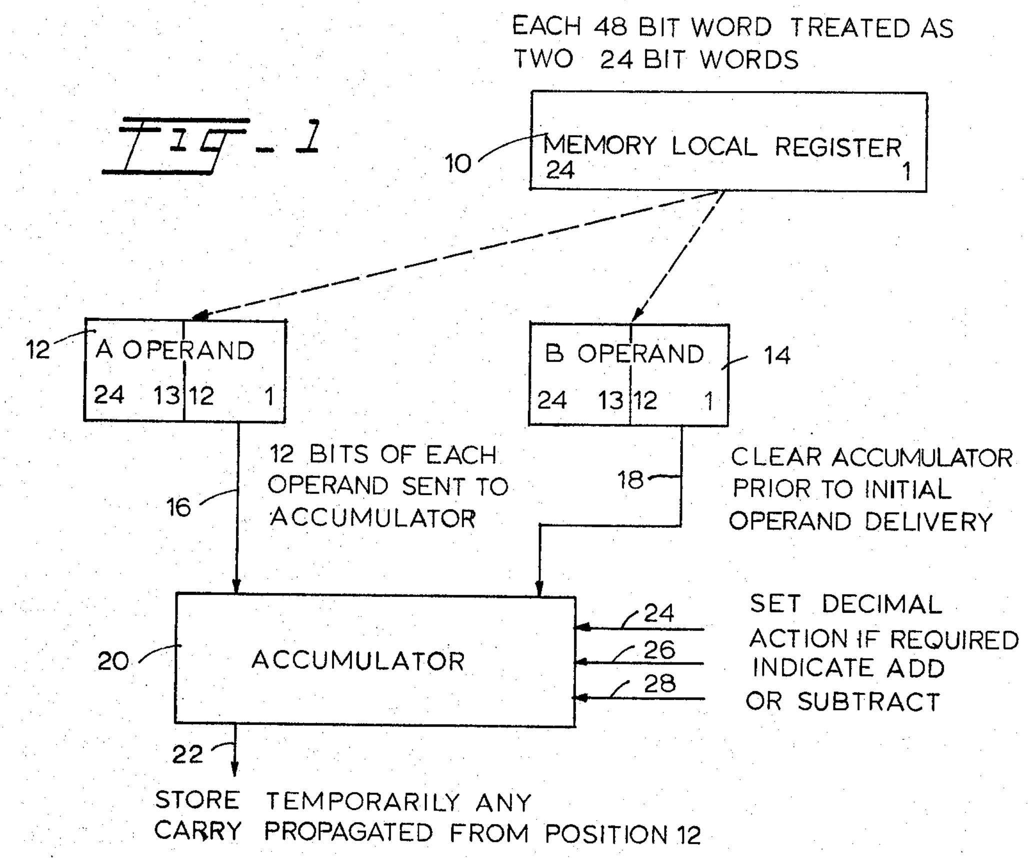
FIGURE 1 is a block diagram showing of an illustrative data processing system utilizing the accumulator of the present invention.

Thus, as shown in FIGURE 1 of the drawing, the memory local register 10 is a register of any suitable type adapted to store twenty-four bits therein. During the operation of the invention, the twenty-four bit word comprising the A operand is transferred to the A operand auxiliary register 12, and simultaneously the twenty-four bit word comprising the B operand is transferred to the B operand auxiliary register 14. The A operand auxiliary register 12 and the B operand auxiliary register 14 operate during each operand delivery cycle to transfer the twelve bits of each operand to the accumulator 20 by means of the transfer lines 16 and 18, respectively. Thus, in this illustrative example of the invention, the accumulator 20 receives twelve bits of each operand, in parallel, to initiate the accumulator operation so as to add or subtract the operands in accordance with a machine instruction.

It further will be appreciated in this illustrative example of the invention that the accumulator 20 advantageously is cleared prior to the initial operand delivery, and as explained in greater detail hereinbelow, appropriate signals are sent over the lines 24, 26 and 28 to set the accumulator for decimal action, if required, and to indicate whether the operation is to be an addition or subtraction operation. In addition, the accumulator is provided with an output line 22 for the purpose of temporarily storing any carry that may have been propagated from the highest bit position—position 12 in this example—of the accumulator after the arithmetic function therein is completed.

Figure 2:
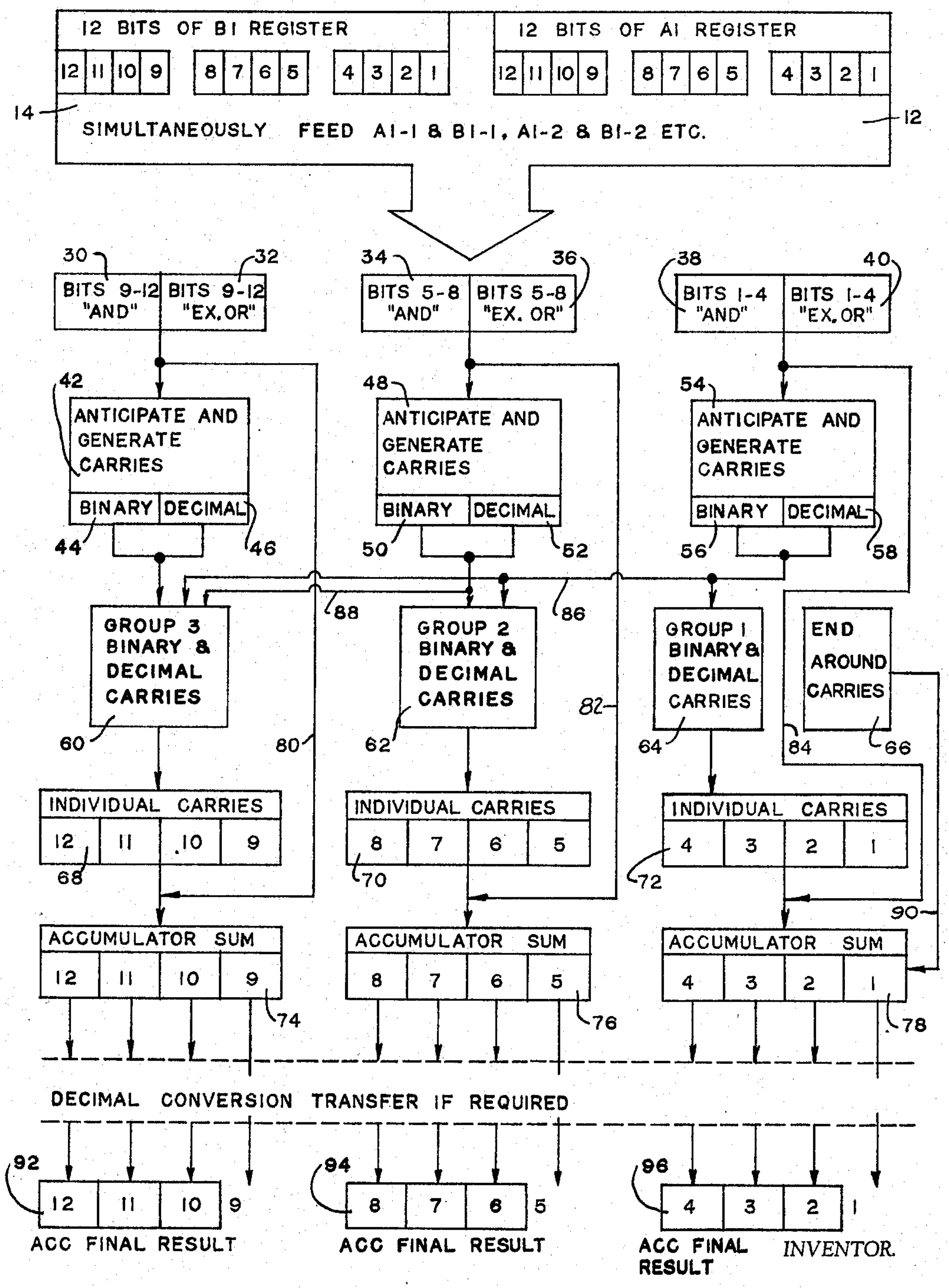
FIGURE 2 is a circuit block diagram of an illustrative data accumulator apparatus embodying the features of the present invention.

FIGURE 2 represents in block diagram form an illustrative accumulator circuit which embodies the advantageous features and principles of the present invention. As there shown, the twelve bit word from the A operand auxiliary register 12 and the twelve bit word from the B operand auxiliary register 14 are transferred simultaneously into a network for generating and anticipating the carry signals required for the arithmetic operation. Advantageously, this network may be comprised of a logical AND accumulator collector area and an Exclusive OR accumulator collector area. Bits 1 through 4 of the A and B register words are simultaneously applied to the logical AND accumulator collector area 38. At the same time, these bits 1 through 4 of the A and B register words are simultaneously applied to the Exclusive OR accumulator register area 40. In a similar fashion, bits 5 through 8 of the A and B register words are simultaneously applied to the logical AND collector area 34 and the Exclusive OR collector area 36, respectively, while bits 9 through 12 of the A and B register words are simultaneously applied to the logical AND collector area 30 and to the Exclusive OR collector area 32, respectively.

As described in greater detail hereinbelow, the Exclusive OR combinations are directly usable for anticipatory carry action resulting from the parallel arithmetic operation, while simultaneously the logical AND combinations can be used for generating any normal carries required. This is effected, as indicated in FIGURE 2, by the Anticipate and Generate Carries area of the circuit, with Anticipate and Generate Carries area 54 being associated with the first group of input bits, bits 1 to 4; with Anticipate and Generate Carries area 48 being associated with the second group of input bits, bits 5 to 8; and with Anticipate and Generate Carries area 42 being associated with the third group of input bits, bits 9 to 12.

In accordance with a salient feature of this invention, each Anticipate and Generate Carries area of the accumulator is provided with means to permit operation in either a binary or decimal mode. As will be shown, the normal operation of the accumulator is binary. A control circuit is set by the machine instructions and it activates the decimal section of the Anticipate and Generate Carries area. Under these operating conditions, the accumulator causes the binary sum to be converted to decimal—if such correction is required—at the output of the accumulator sum area of the system, to thereby provide a correct accumulator final result.

In describing the illustrated embodiment of the present invention, the logic used is sometimes referred to as inverter logic. That is, when the input terms are "true," (logic one or −5 volts) the output term will be "false" (logic zero or ground).

Figure 3:
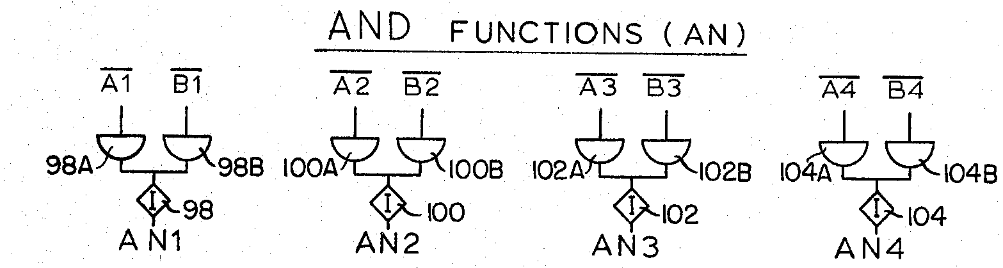
FIGURE 3 is a diagrammatic showing of the AND function circuit elements used in the logical AND collector area of the accumualtor of FIGURE 2.

The logical AND functions (AN) of the accumulator will now be described in detail and will be illustrated by the circuit construction and operation of the first group logical AND collector area 38 which processes bits 1 through 4 of the A and B register words. For this purpose, reference is made to the logical AND function circuit elements shown in FIGURE 3 of the drawing.

As there shown, the $\overline{A1}$ and $\overline{B1}$ input bits to the gates 98A and B, respectively, provide a true output AN1 on inverter 98 upon the occurrence of one bit in each of the A1 and B1 positions. Similarly, there is an AN2 output from the inverter 100 upon the occurrence of one bits on the A2 and B2 inputs on gates 100A and 100B, respectively. There is an output AN3 from the inverter 102 upon the occurrence of one bits on the A3 and B3 inputs on gates 102A and B, respectively; and there is an output AN4 upon the occurrence of one bits on the A4 and B4 inputs.

Thus, in the logical AND accumulator collector area 38, the combination of the A and B operand bits provides an output from a respective AND function upon the occurrence of one bits in both operands. This can be expressed by the equations:

$$AN1=\overline{A1}+\overline{B1}$$
$$AN2=\overline{A2}+\overline{B2}$$
$$AN3=\overline{A3}+\overline{B3}$$
$$AN4=\overline{A4}+\overline{B4}$$

The AND functions (AN) then will react as follows when indicated combinations of bits are sensed:

| | A1 | B1 | AN1 |
|---|---|---|---|
| Case 1 | 0 | 0 | =No output (For example 0 volts). |
| Case 2 | 0 | 1 | =No output. |
| Case 3 | 1 | 0 | =No output. |
| Case 4 | 1 | 1 | =Output (For example, −5 volts). |

In Case 4, a carry generation function also will be required. It also will be appreciated by those skilled in the art that corresponding circuit diagrams and equations exist for the remaining combination of A and B bits applied to the other logical AND accumulator collector areas.

Figure 4:
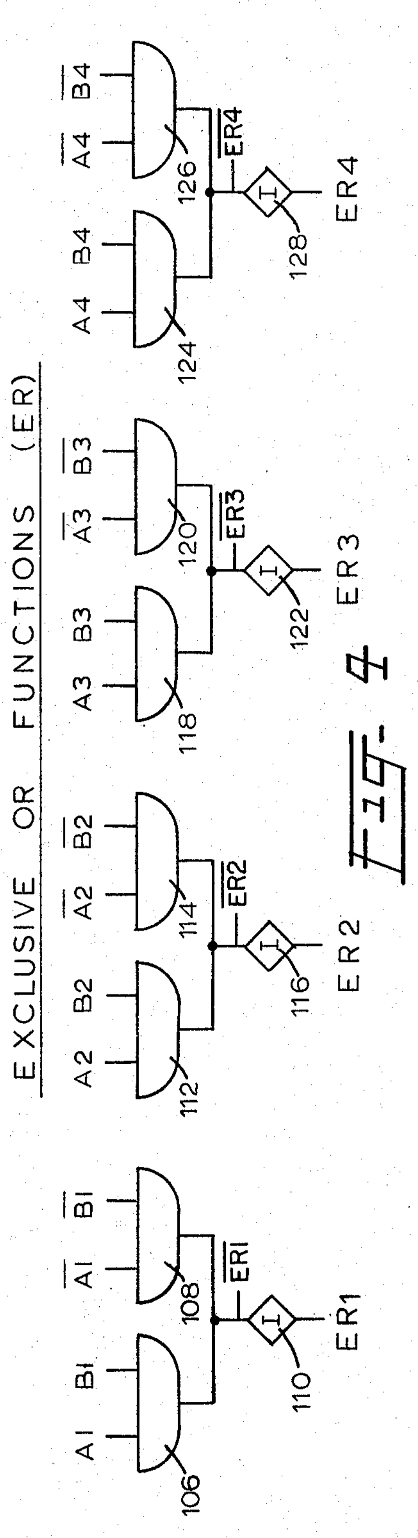
FIGURE 4 is a diagrammatic showing of the EXCLUSIVE OR function circuit elements used in the EXCLUSIVE OR collector area of the accumulator of FIGURE 2.

In the Exclusive OR collector area 40, the corresponding bits from each of the A and B operands are combined in a manner which assures that an output (ER) will only be obtained if there is a one bit in a respective position of either operand, but not in both of the operands. As shown by the diagrammatic circuit of FIGURE 4, the A1 and B1 inputs are applied to the gate 106 while the $\overline{A1}$ and the $\overline{B1}$ inputs are applied to the gate 108, with the output of both gates 106 and 108 being applied through the inverter 110 to provide the ER1 output. Similarly, the A2 and B2 inputs are applied to the gate 112 and the $\overline{A2}$ and $\overline{B2}$ inputs are applied to the gate 114, with the output of both gates 112 and 114 being applied through the inverter 116 to provide the ER2 output. Also, the A3 and B3 inputs are applied to the gate 118, with the $\overline{A3}$ and $\overline{B3}$ inputs being applied to the gate 120, such that the outputs of both gates 118 and 120 are applied through the inverter 122 to provide the ER3 output. Also, the A4 and B4 inputs are applied to the gate 124, with the $\overline{A4}$ and $\overline{B4}$ inputs being applied to the gate 126, such that the outputs of both gates 124 and 126 are applied through the inverter 128 to provide the ER4 output.

The above Exclusive OR function for the first group of four bits may be expressed by the following equations:

$$ER1=A1\cdot B1+\overline{A1}\cdot\overline{B1}$$
$$ER2=A2\cdot B2+\overline{A2}\cdot\overline{B2}$$
$$ER3=A3\cdot B3+\overline{A3}\cdot\overline{B3}$$
$$ER4=A4\cdot B4+\overline{A4}\cdot\overline{B4}$$

The following table examines the combinations of inputs and their resultants:

| | A1 | B1 | ER1 |
|---|---|---|---|
| Case 1 | 0 | 0 | =Output at 0 volts. |
| Case 2 | 0 | 1 | =Output at −5 volts. |
| Case 3 | 1 | 0 | =Output at −5 volts. |
| Case 4 | 1 | 1 | =Output at 0 volts. |

It thus can be seen that these collector areas furnish a means for the derivation of binary sums consistent with minimal logic implementation and conservative circuit loading. The Exclusive OR combinations are directly usable for anticipatory carry action resulting from the parallel arithmetic function, while simultaneously the logical AND combinations can generate any normal carries required.

Referring back to FIGURE 2, it can be seen that the output of the logical AND and Exclusive OR collector areas are applied to respective Anticipate and Generate Carries function areas. Those skilled in the art will appreciate that performing an arithmetic operation in a parallel manner, such that the lower order bits are being processed at the same time that the higher order bits also are being processed, necessitates the use of auxiliary functions responsible for the anticipation of any lower order carries before the latter actually occur. Each of the higher order functions must be given the opportunity to sample all possible combinations of lower order bits prior to a determination of the result.

It also will be appreciated by those skilled in the art that the entire carry operation including anticipatory action normally could be complicated by the necessity of both decimal and binary operations, as is performed by the accumulator apparatus of the present invention. Thus, a set of circumstances that might induce a carry to take place in the decimal system would not necessarily also induce a carry in binary operation. Therefore, in accordance with a highly novel feature of the present invention, two separate categories of carry functions are available in the accumulator. The actual one used is determined by the performance of binary or decimal arithmetic. In the illustrative inventive accumulator disclosed herein, the accumulator processes the arithmetic function in binary and then converts the final results into decimal, if correction is necessary as indicated by a suitable instruction prior to the delivery of the final result.

As shown in FIGURE 2 of the drawing, each group of four bits is associated with an Anticipate and Generate Carries function circuit which receives an input from its associated logical AND and Exclusive OR accumulator collector areas. Thus, the Anticipate and Generate Carries circuit 42 receives its input from the logical AND and Exclusive OR collector areas 30 and 32; and Anticipate and Generate Carries circuit 48 receives its input from the logical AND and Exclusive OR collector areas 34 and 36; and the Anticipate and Generate Carries circuit 54 receives its input from the logical AND and Exclusive OR collector areas 38 and 40.

It will be noted that each anticipate and generate carries circuit is provided with a binary and decimal section to accommodate either type of circuit operation upon receipt of a proper instruction. Thus, the binary and decimal sections 44 and 46, respectively, are associated with the Anticipate and Generate Carries circuit 42; the binary and decimal sections 50 and 52 are associated with the Anticipate and Generate Carries circuit 48; while the binary and decimal sections 56 and 58, respectively, are associated with the Anticipate and Generate Carries circuit 54.

When the data processing accumulator apparatus is operating in the binary mode, binary anticipatory carry functions (BAC) are required for the condition that a carry may be introduced into a group of all one bits thereby providing a guarantee of carry propagation. This is illustrated by the following equations which represent the binary anticipatory carry function for the four bits of Group 1:

$$BAC1=ER1\cdot ER2\cdot ER3\cdot ER4$$
$$BAC2=ER5\cdot ER6\cdot ER7\cdot ER8$$
$$BAC3=ER9\cdot ER10\cdot ER11\cdot ER12$$

Figure 5:
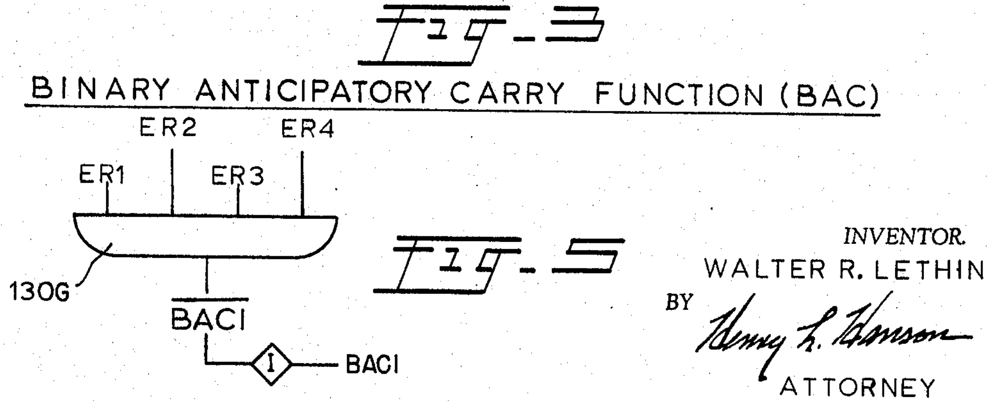
FIGURE 5 is a diagramamtic showing of the BINARY ANTICIPATORY CARRY FUNCTION circuit elements utilized for one four bit group of the accumulator of FIGURE 2.

It will be appreciated by those skilled in the art that these functions will be true when no carry is anticipated. Thus, as illustrated in FIGURE 5, when the ER1, ER2, ER3, and ER4 inputs are applied to the gate 130G, the output, BAC1, will be true only when all of the inputs to the gate have no bit applied thereto.

Figure 6:
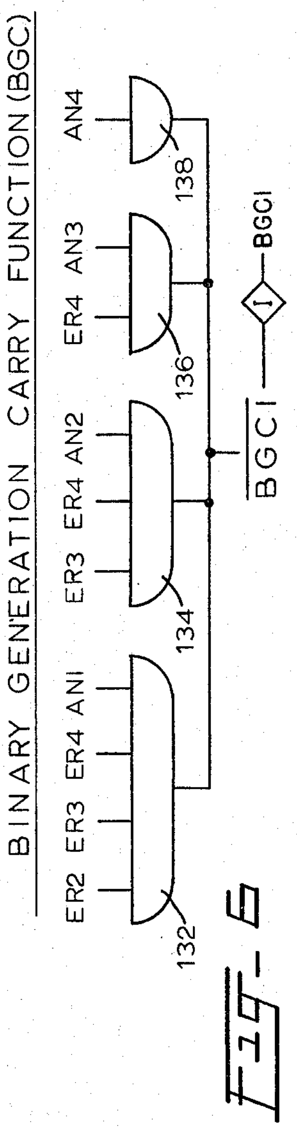
FIGURE 6 is a diagrammatic showing of the BINARY GENERATION CARRY FUNCTION circuit elements utilized for one four bit group of the accumulator of FIGURE 2.

In addition to the above-described binary anticipatory carry function, there are three binary generation carry functions (BGC) which are responsible for the generation of a carry bit when certain combinations of input bits are received by the logical AND collector area 38 and the Exclusive OR collector area 40. A representative binary generation carry function circuit for the four bits of Group 1 is shown in FIGURE 6 of the drawing wherein it can be seen that the ER2, ER3, ER4 and AN1 inputs are applied to the gate 132; the ER3, ER4, and AN2 inputs are applied to the gate 134; the ER4 and AN3 inputs are applied to the gate 136; and the AN4 input is applied to the gate 138. The BGC1 output is connected to the common output of all of the four gates. This may be expressed by the equation:

$$BGC1=ER4\cdot ER3\cdot ER2\cdot AN1+ER4\cdot ER3\cdot AN2 +ER4\cdot ER3\cdot AN2+ER4\cdot AN3+AN4$$

An examination of the Group 1 binary generation carry function shows that the output BGC1 will be present or "true" when no combination of bits is sensed requiring that a carry be generated. For example:

| | | | | | |
|---|---|---|---|---|---|
| Gate 1 | ER4 1 | ER3 1 | ER2 1 | AN1 1 1 | =Output at ground (carry generated). |
| Gate 2 | ER4 1 | ER3 1 | AN2 1 1 | x | =Output at ground (carry generated). |
| Gate 3 | ER4 1 | AN3 1 1 | x | x | =Out putat ground (carry generated). |
| Gate 4 | AN4 1 1 | x | x | x | =Output at ground (carry generated). |

Figure 7:
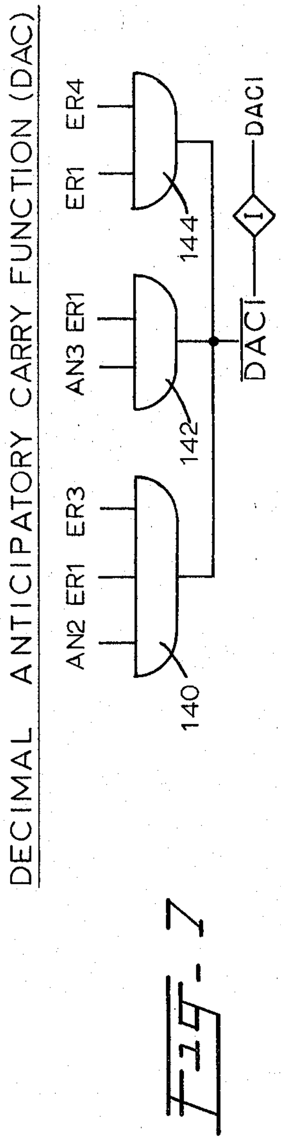
FIGURE 7 is a diagrammatic showing of the DECIMAL ANTICIPATORY CARRY FUNCTION circuit elements utilized for one four bit group of the accumulator of FIGURE 2.

Decimal carry anticipation and generation is handled in a similar manner, but under changed conditions of course. Three decimal anticipatory carry functions (DAC) are required to cope with the occurrence of operands with two input digits whose sum will be 9. Any input carries into the sum of these digits will then alter this sum and propagate the carry. This is exemplified by the decimal anticipatory carry function circuit for Group 1 (DAC1) as shown in FIGURE 7 of the drawing. As there shown, the AN2, ER1 and ER3 inputs are applied to gate 140; the AN3 and ER1 inputs are applied to the gate 142; and the ER1 and ER4 inputs are applied to gate 144, with the common output of the gates going through an inverter to form the DAC1 function.

This representative function for Group 1 may be expressed by the following equation:

$$DAC1=AN2\cdot ER1\cdot ER3+AN3\cdot ER1+ER4\cdot ER1$$

Obviously, these functions will be activated or true only when no combination of the input digits equals nine. For example:

| | | | | | |
|---|---|---|---|---|---|
| Gate 1 | -------<br>x | ER3<br>1 | AN2<br>1<br>1 | ER1<br>1 | =(6.3, 7.2) and output at ground. |
| Gate 2 | -------<br>x | AN4<br>1<br>1 | -------<br>x | ER1<br>1 | =(5.4) and output at ground. |
| Gate 3 | ER4<br>1 | -------<br>x | -------<br>x | ER1<br>1 | =(8.1, 9.0) and output at ground. |

The situations where combinations of input digits will be greater than nine and generate a carry are controlled by the decimal generate carry functions (DGC). This is illustrated by the following equations for the first and third group in the accumulator:

$$DGC1=AN1\cdot AN2\cdot ER3+AN2\cdot AN3+AN1\cdot AN3+AN1\cdot ER4+AN3\cdot ER2+ER4\cdot ER3+ER4\cdot ER2+AN4$$

$$DGC3=AN9\cdot AN10\cdot ER11+AN10\cdot AN11+AN9\cdot AN11+AN9\cdot ER12+AN11\cdot ER10+ER12\cdot ER11+ER12\cdot ER10+AN12$$

The first equation for the Group 1 decimal generation carry function (DGC1) is shown diagrammatically in FIGURE 8 wherein gate 146 has the input AN1, AN2 and ER3; gate 148 has the inputs AN2 and AN3; gate 150 has the inputs AN1 and AN3; gate 152 has the inputs AN1 and ER4; gate 154 has the inputs AN3 and ER2; gate 156 has the inputs ER3 and ER4; gate 158 has the inputs ER2 and ER4; and gate 160 has the input AN4. It therefore can be appreciated that when the illustrative decimal generation carry function of FIGURE 8 is true, no carry will be generated. For example:

| | | | | | |
|---|---|---|---|---|---|
| Gate 1 | -------<br>x | ER3<br>1 | AN2<br>1<br>1 | AN1<br>1<br>1 | =(10) and output at ground. |
| Gate 1 | -------<br>------- | AN3<br>1 | AN2<br>1 | -------<br>------- | =($\geq$12) and output at ground. |
| Gate 2 | -------<br>x | AN3<br>1<br>1 | -------<br>x | AN1<br>1<br>1 | =($\geq$10) and output at ground. |
| Gate 3 | ER4<br>1 | -------<br>x | -------<br>x | AN1<br>1<br>1 | =($\geq$10) and output at ground. |
| Gate 4 | -------<br>x | AN3<br>1<br>1 | ER2<br>1 | -------<br>------- | =($\geq$10) and output at ground. |
| Gate 5 | ER4<br>1 | ER3<br>1 | -------<br>x | -------<br>x | =($\geq$12) and output at ground. |
| Gate 6 | ER4<br>1 | -------<br>------- | -------<br>1 | -------<br>------- | =(10) and output at ground. |
| Gate 7 | AN4<br>1<br>1 | -------<br>x | -------<br>x | -------<br>x | =($\geq$16 carry) and output at ground. |

Those skilled in the art now will appreciate from the above-detailed description of the illustrative circuit construction and operation that thus far twelve input bits from each of the two A and B operands have been combined so that all individual combinations of these bits are identified. A determination of any carry generated as a result of these combinations is also available preparatory to the actual summation.

Figure 9:
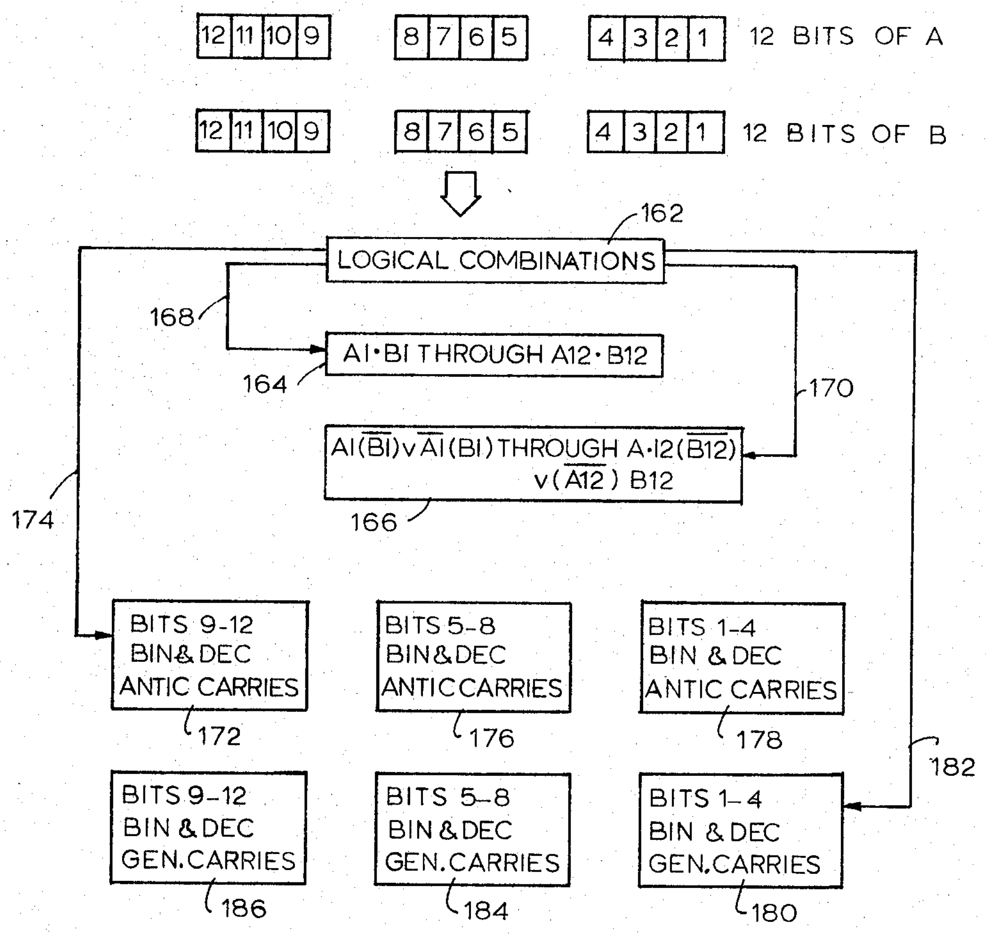
FIGURE 9 is a chart in block form illustrating the accumulator summation functions in the illustrative embodiment of FIGURE 2.
Figure 10:
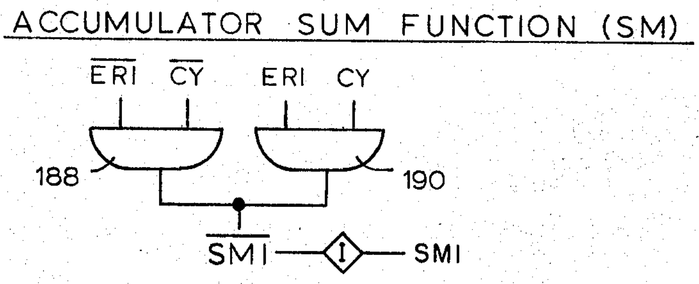

In accordance with a feature of this invention, summation is performed in a series of twelve accumulator sum functions (SM). Logically, these functions are nothing more than an Exclusive OR of the respective outputs of the Exclusive OR functions and the previous bit individual carry out functions. This is illustrated in FIGURE 9 of the drawing which shows the twelve bits of the A and B operand as combined into all of the logical combinations at 162. This includes the logical combinations of $A1\cdot B1$ through $A12\cdot B12$ at 164, and further includes all combinations of A1 $\overline{(B1)}+\overline{A1}$ (B1) through A12 $\overline{(B12)}+\overline{(A12)}$ B12 at 166. The bits 1 through 4 are provided with a binary and decimal anticipatory carry function at 178; bits 5 through 8 are provided with binary and decimal anticipatory carry functions at 176; and bits 9 through 12 are provided with binary and decimal anticipatory carry functions at 172. Also included are bits 1 through 4 binary and decimal generation carry at 180; bits 5 through 8 binary and decimal generation carry at 184; and bits 9 through 12 binary and decimal generation carry at 186.

Figure 10:
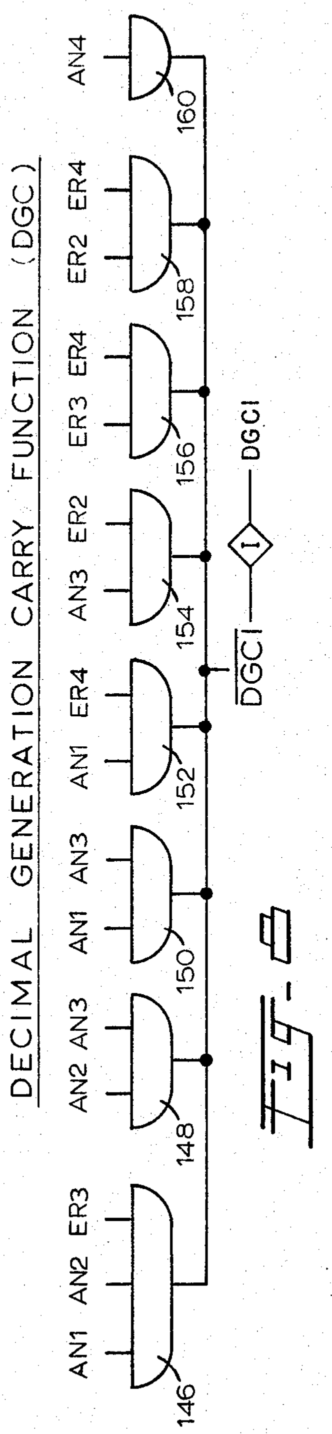
FIGURE 10 is a diagrammatic showing of the ACCUMULATOR SUM FUNCTION circuit elements utilized for one four bit group of the accumulator of FIGURE 2.

The accumulator sum function (SM) may be illustrated by an examination of the operation for bits A1 and B1, the first bits of the twelve bit word in the accumulator. As shown in FIGURE 10 of the drawing, the $\overline{ER1}$ and $\overline{CY0}$ inputs to the gate 188, and ER1 and CY0 inputs to the gate 190 provide the accumulator sum function SM1. This may be expressed by the equation:

$$SM1=\overline{ER1}\cdot\overline{CY0}+\overline{ER1}\cdot\overline{CY0}$$

where CY0 represents the end around carry.

Figure 11:
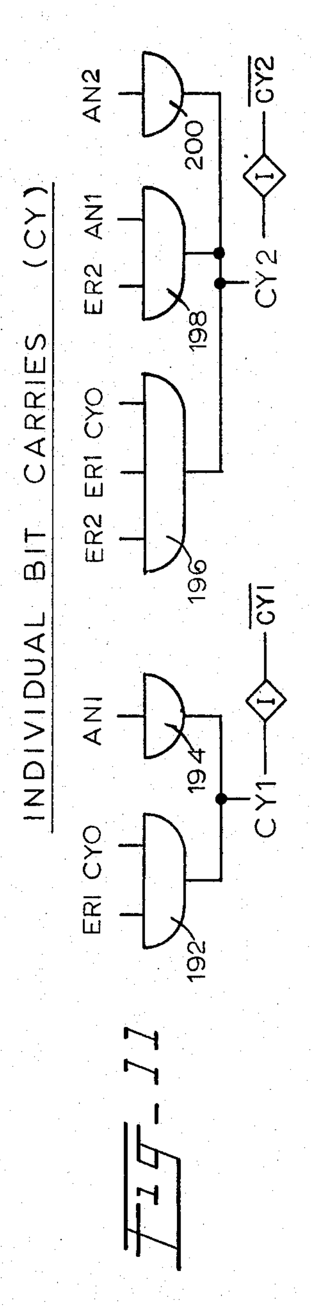
FIGURE 11 is a diagramamtic showing of the INDIVIDUAL BIT CARRIES circuit elements utilized for two of the input bits of the accumulator of FIGURE 2.

In a similar fashion, bits 2 through 12 may be processed to provide the accumulator sum functions, SM2 to SM12. Since the accumulator sum will be high only if neither of the input gates are satisfied for each bit position, the following situations prevail:

Case 1: A1+B1 and No End Around Carry=output true
Case 2: $A1\cdot B1+\overline{A1}\cdot\overline{B1}$ and an End Around Carry=output true Those skilled in the art will appreciate that concurrently with the summation action, the individual bit carries (CY1) must be propagated. The individual bit carries functions (CY) and (CY0) examine the AND function and certain combinations of the Exclusive OR functions for each of the twelve input bits. This may be illustrated by an examination of the processing of the first and second input bits, as shown in FIGURE 11 of the drawing. It there can be seen that the inputs ER1 and CY0 are applied to the gate 192, and the input AN1 is applied to the gate 194. The output of these gates provide the individual bit carry function CY1. This may be expressed by the equation:

$$CY1=ER1\cdot CY0+AN1$$

Similarly, FIGURE 11 of the drawing shows the inputs ER2, ER1, and CY0 applied to the gate 196; the inputs ER2 and AN1 applied to the gate 198; and the input AN2 applied to the gate 200. The outputs of these three gates are connected in common to provide the individual bit carry function CY2 for the bit number 2 of the twelve input bits. This may be expressed by the equation:

$$CY2=ER2\cdot ER1\cdot CY0+ER2\cdot AN1\cdot AN2$$

It will be appreciated by those skilled in the art that similar equations and diagrammatic circuits exist for the remaining bits of the input operands such that the proper functions are examined to provide and propagate the necessary individual but carries concurrent with the summation action.

It is to be noted that not all of the individual bit carries are limited to the operation described hereinabove. Rather, certain (CY) individual bit carries generated from the higher order bit position of each group—accumulator bit position 4 of Group 1, bit position 8 of Group 2, and bit position 12 of Group 3 in the present illustrative example—and the (CY0) carry function into bit position one are different in scope from the remaining individual bit carries. Prior to an examination of these particular functions, it would be helpful to review the operation of the accumulator group carry functions (BCY1–BCY3, DCY1–DCY3 and CY0).

In considering the question, it is important to remember that the functions are logically negative when a true output is desired. Thus, all input buffer gates must be at ground or false to produce a true output represented by minus 5 volts.

Figure 12:
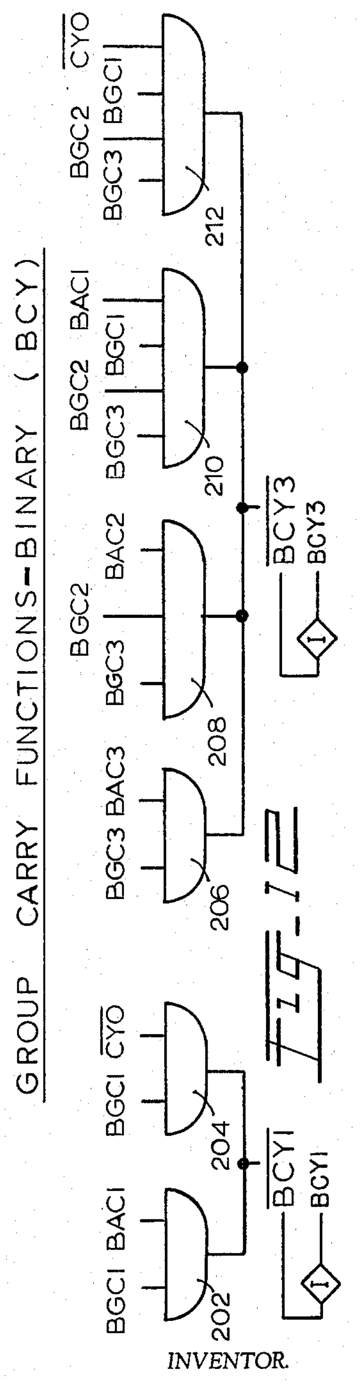
FIGURE 12 is a diagrammatic showing of the GROUP CARRY FUNCTION—BINARY circuit elements utilized for the four bit Groups 1 and 3 of the accumulator of FIGURE 2.

The group carry function for the Group 1 bits operating in a binary mode (BCY) is illustrated by FIGURE 12 of the drawing. Thus, as there shown, the BGC1 and the BAC1 inputs are applied to the gate 202, while the BGC1 and $\overline{CY0}$ inputs are applied to the gate 204, to provide the BCY1 output which is the group carry function for the Group 1 bits in the accumulator. This function may be expressed by the equation:

$$BCY1=BGC1\cdot BAC1+BGC1\cdot\overline{CY0}$$

The binary group carry function for the Group 3 bits of the accumulator is illustrated in FIGURE 12 as comprising a BGC3 input and a BAC3 input to the gate 206; a BGC3 input, a BGC2 input, and a BAC2 input to the gate 208; a BGC3 input, a BGC2 input, a BGC1 input and a BAC1 input to the gate 210; and a BGC3 input, a BGC2 input, a BGC1 input and a $\overline{CY0}$ input to the gate 212. These four gates have their outputs connected to provide the Group 3 binary group carry function BCY3. This function may be expressed by the following equation:

$$BCY3=BGC3\cdot BAC3+BGC3\cdot BGC2\cdot BAC2+BGC3\cdot BGC2\cdot BGC1\cdot BAC1+BGC3\cdot BGC2\cdot BGC1\cdot CY0$$

It will be appreciated that the parallel mode of operation of the accumulator requires consideration of any anticipation of carries originating in the lower order groups which may be propagated. Accordingly, the Group 3 binary group carry function BCY 3 may be reviewed as follows:

Case 1: Whenever a carry out from the bits in Group 3 is generated (BGC3), an input to each of the four gates of BCY3 will be at zero volts, driving the Group 3 binary carry function high (—5 volts).

Case 2: When a carry out from the bits in Group 2 is generated (BGC2), an input to the lower three gates of the BCY3 function will be at zero volts. If this carry is to propagate to a combination of Group 3 bits of 1111, then the Group 3 anticipatory function (BAC3) will also be at zero volts to condition the upper gates such that once more the Group 3 binary carry function (BCY3) will be high (—5 volts).

Case 3: Even if a carry out from bits in Group 1 is generated and encounters an all one combination of bits in Group 2 and Group 3, the Group 3 binary carry function (BCY3) will be excited.

Gate 1:=BAC3 at 0 volts
Gate 2:=BAC2 at 0 volts
Gate 3·4:=BGC1 at 0 volts

Case 4: An end around carry into the Group 1 bits may generate the function BCY3 if the configuration of the bits in Groups 1, 2 and 3 comprise all ones, since each of the group anticipatory carry functions will be at zero volts.

Figures 13, 14, 15:
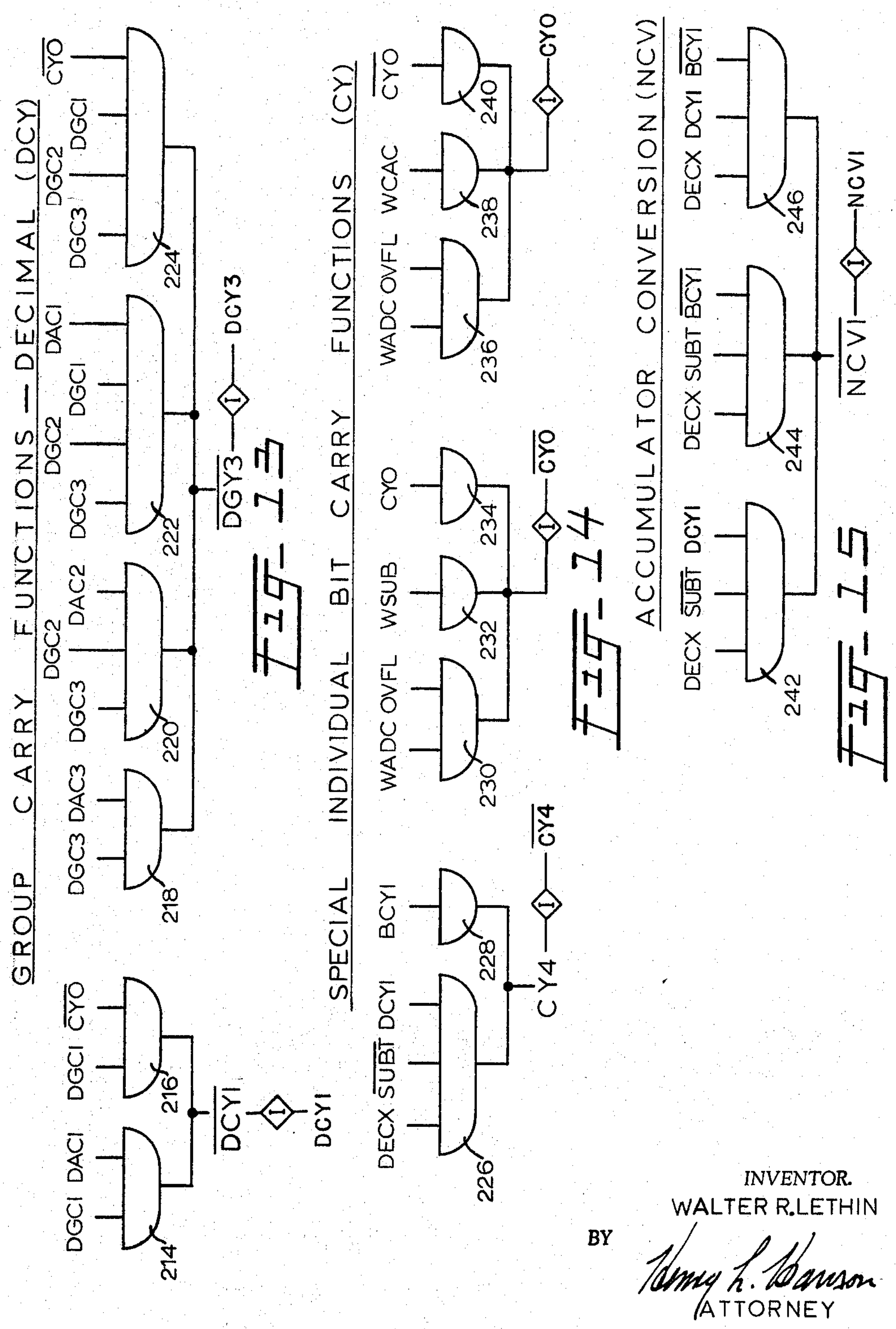
FIGURE 13 is a diagrammatic showing of the GROUP CARRY FUNCTIONS—DECIMAL circuit elements utilized for the four bit Groups 1 and 3 of the accumulator of FIGURE 2.
FIGURE 14 is a diagrammatic showing of the SPECIAL INDIVIDUAL BIT CARRY FUNCTIONS circuit elements utilized for the carry functions from bit positions 4 to 12 of the accumulator of FIGURE 2.
FIGURE 15 is a diagrammatic showing of the ACCUMULATOR CONVERSION function circuit elements utilized for the accumulator of FIGURE 2.
Figure 16:
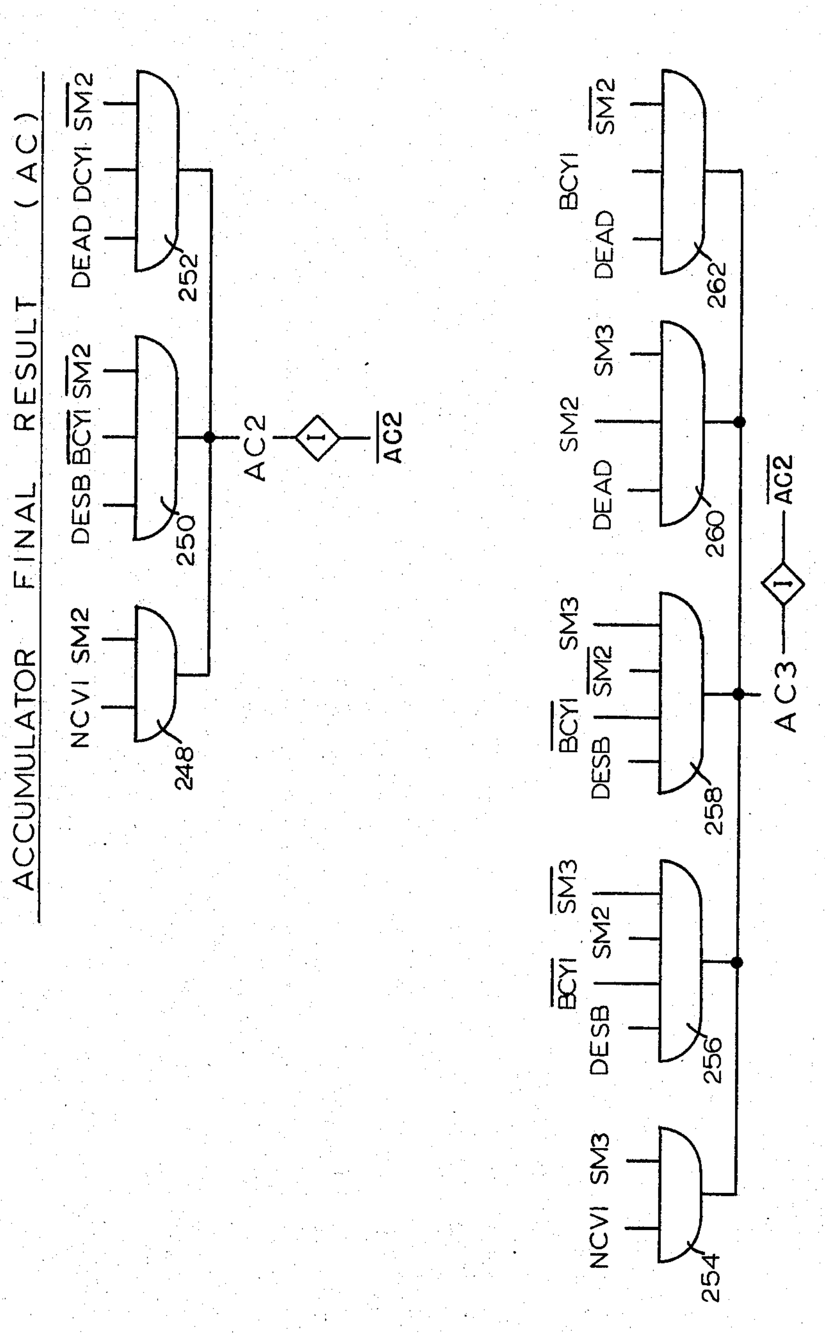
FIGURE 16 is a diagrammatic showing of the ACCUMULATOR FINAL RESULT circuit elements utilized for the accumulator of FIGURE 2.

Looking now at the group carry functions of the accumulator when it is operating in the decimal mode (DGC), reference is made to the diagrammatic circuit showing of FIGURE 13 which illustrates the group decimal carry function for Groups 1 and 3 of the accumulator. As shown in FIGURE 13, the DGC1 and DAC1 inputs are applied to the gate 214, while the DGC1 and $\overline{CY0}$ inputs are applied to the gate 216. These gates are connected to provide a common output DCY1, which is the Group 1 carry function in the decimal mode. This may be expressed by the following equation:

$$DCY1=DGC1\cdot DAC+DGC\overline{1}\cdot\overline{CY0}$$

Likewise, the Group 3 carry function is decimal mode (DCY3) is illustratively shown in FIGURE 13 wherein the DGC3 and the DAC3 inputs are applied to the gate 218; the DGC3, the DGC2 and the DAC2 inputs are applied to the gate 220; the DGC3, the DGC2, the DGC1 and the DAC1 inputs are applied to the gate 222; and the DGC3, the DGC2, DGC1 and $\overline{CY0}$ inputs are applied to the gate 224. The output of these gates are connected to provide the function DCY3. The latter may be expressed by the following equation:

$$DCY3=DGC3\cdot DAC3+DGC3\cdot DGC2\cdot DAC2+DGC3\cdot DGC2\cdot DGC1\cdot DAC1+DGC3\cdot DGC2\cdot DGC1\cdot\overline{CY0}$$

Returning now to the individual bit carry functions from the particular bit positions 4, 8, and 12 of Groups 1, 2 and 3 respectively of the present illustrative accumulator, it can be seen that the binary or decimal group carry functions are used as collectors in this area. Thus, as shown in FIGURE 14 of the drawing, the special individual bit carry function from bit position 4 ($\overline{CY4}$) is achieved by applying to gate 226, the input DECX (indicating a decimal operation), $\overline{SUBT}$ (indicating that the operation is not a subtract), and the input DCY1 (indicating the decimal carry function for Group 1). The input BCY1 (the group carry function binary for Group 1) is applied to the gate 228, and the outputs of gates 226 and 228 provide the special individual bit carry functions $\overline{CY4}$ from bit position 4. This may be expressed by the following equation:

$$\overline{CY4}=DECX\cdot\overline{SUBT}\cdot DCY1+BCY1$$

When a decimal group carry exists, the function DCY1 is activated, and the operation is a decimal operation, with function DECX activated, and further, if the operation is not a subtract with the function $\overline{SUBT}$ activated, then the carry generates from bit position 4 (CY4). Also, the occurrence of any binary group carry BCY1 function serves to activate the carry function CY4.

The carry into bit position 1, otherwise known as the end around carry (CY0) is an accumulator function which stores a carry-out from the highest bit position of the accumulator, which in this illustrative example is bit position 12. During the subtraction operation, however, the end around carry into bit position 1 advantageously can be used to provide a free one bit which is applied into the lower order position of the accumulator during the addition of the first twelve bits of each operand.

In this particular illustrative embodiment of the invention, this end around carry function to provide such a free one bit may be effected by applying to Gate 232 the WSUB input. The subcommand Advance Carry (WADC) and a signal from an overflow flip-flop circuit indicating overflow from the accumulation bits position 12 (OVFL) provide end around carry. Accordingly, the end around carry function can be diagrammatically illustrated as shown in FIGURE 14 wherein the WADC input and the OVFL input are applied to the gate 230; the WSUB input indicating set the subtract flip-flop and add a one bit to the accumulator) is applied to the gate 232; and the CY0 input is applied to the gate 234. This gives rise to the function $\overline{CY4}$ at inverter output. In a similar fashion, the complement of this end around carry function (CY0) is provided as diagrammatically shown in FIGURE 14 by the application of the WADC and OVFL inputs to the gate 236; the WCAC input (indicating clearing of the accumulator) to the gate 238; and the $\overline{CY0}$ input to the gate 240. These functions may be expressed by the folowing equations:

$$\overline{CY0}=WADC\cdot OVFL+WSUB\cdot CY0$$

$$CY0=WADC\cdot OVFL+WCAC\cdot \overline{CY0}$$

It now can be understood by those skilled in the art that when the Advance Carry function (WADC) is active and the overflow function (OVFL) has been set because of a carry out from the accumulator bit position 12 at the partial result delivery time, the conditions of Gate 1 for the above above described $\overline{C4Y0}$ logic are satisfied so that this carry out can be temporarily stored for the next twelve bit add cycle.

At the beginning of each subtraction operation, the WSUB function will be activated to add a free one bit into a lower order position of the accumulator. This, too, will satisfy the end around carry function $\overline{CY0}$, as explained hereinabove, and a one bit will be stored until the actual arithmetic action begins. The input $\overline{CY0}$ is provided since the end around carry function, being a storage device, must recirculate, and the function is reset when no overflow is sensed at Advance Carry subcommand time. Furthermore, subcommand Clear Accumulator (WCAC), which occurs prior to each arithmetic cycle, also serves to reset the CY0 function.

Thus, at the completion of the various functions described hereinabove, the two input operands A and B of twelve bits each have been combined and an AND and an Exclusive OR result formulated. The anticipatory and generated carries have been estblished regardless of whether the operation was in the binary or decimal mode. The twelve bit operand portions in the particular illustrative example described herein have been divided into three groups of four bits each and the group carry functions have been activated. A sum and an individual carry for each pair of bits has been made and the final result of the accumulator arithmetic operation is ready to be provided. However, in accordance with another feature of this invention, before the final result is obtained, a conversion from binary to decimal must be considered, if necessary. Conversion logic is provided on the inputs to the Final Result functions (AC2–AC4) and (AC6–AC8) and (AC10–AC12).

Since the low order binary bit of any four bit binary number will be equal to the low order binary bit of an associated decimal number, no conversion at the accumulator bit positions 1, 5 or 9 (AC1, AC5, AC9), respectively, is required.

Before any examination of the conversion can take place, three auxiliary functions must be examined. These are the No Binary to Decimal Conversion functions (NCV1–NCV3), there being one for each accumulator group. Reference is now made to FIGURE 15 of the drawing which illustrates the circuit logic utilized in this function (NCVD) for Group 1 of the accumulator. As there shown, the DECX, $\overline{SUBT}$, and DCY1 inputs are applied to the gate 242; the DECX, SUBT, and $\overline{BCY1}$ inputs are applied to the gate 244; and the DECX, DCY1, and $\overline{BCY1}$ inputs are applied to the gate 246. The outputs of these three gates provide the accumulator conversion function NCV1 for the first accumulator group. This can be expressed by the following equation:

$$NCV1=DECX\cdot \overline{SUBT}\cdot DCY1+DECX\cdot SUBT\cdot \overline{BCY1}+DEXC\cdot DCY1\cdot \overline{BCY1}$$

Those skilled in the art will appreciate that corresponding circuit logic elements and equations exist for the conversion function for accumulator Groups 2 and 3.

Case 1: The function DEXC, the Decimal Flip-Flop, will be at ground (0 volts) if the operation is binary and conversion is not required. Since it appears on all three input gates, it effectively drives NCV1 to −5 volts. However, if the operation were decimal, the function DECX would be true (−5 volts) and conversion could be a distinct possibility. Reference is made to the following table in exploring these possibilities:

| Carry | Binary | | | | Decimal | | |
|---|---|---|---|---|---|---|---|
| | $2^3$ | $2^2$ | $2^1$ | $2^0$ | $10^1$ | | $10^0$ |
| 0 | 0 | 0 | 0 | 0 | 0 | 0 0 0 | 0 |
| 0 | 0 | 0 | 0 | 0 | 0 | 0 0 0 | 1 |
| 0 | 0 | 0 | 1 | 0 | 0 | 0 0 1 | 0 |
| 0 | 0 | 0 | 1 | 1 | 0 | 0 0 1 | 1 |
| 0 | 0 | 1 | 0 | 0 | 0 | 0 1 0 | 0 |
| 0 | 0 | 1 | 0 | 1 | 0 | 0 1 0 | 1 |
| 0 | 0 | 1 | 1 | 0 | 0 | 0 1 1 | 0 |
| 0 | 0 | 1 | 1 | 1 | 0 | 0 1 1 | 1 |
| 0 | 1 | 0 | 0 | 0 | 0 | 1 0 0 | 0 |
| 0 | 1 | 0 | 0 | 1 | 0 | 1 0 0 | 1 |
| 0 | 1 | 0 | 1 | 0 | 1 | 0 0 0 | 0 |
| 0 | 1 | 0 | 1 | 1 | 1 | 0 0 0 | 1 |
| 0 | 1 | 1 | 0 | 0 | 1 | 0 0 1 | 0 |
| 0 | 1 | 1 | 0 | 1 | 1 | 0 0 1 | 1 |
| 0 | 1 | 1 | 1 | 0 | 1 | 0 1 0 | 0 |
| 0 | 1 | 1 | 1 | 1 | 1 | 0 1 0 | 1 |
| 1 | 0 | 0 | 0 | 0 | 1 | 0 1 1 | 0 |
| 1 | 0 | 0 | 0 | 1 | 1 | 0 1 1 | 1 |
| 1 | 0 | 0 | 1 | 0 | 1 | 1 0 0 | 0 |
| 1 | 0 | 0 | 1 | 1 | 1 | 1 0 0 | 1 |

Case 2: If the binary sum to be converted were a combination of four bits with a value less than or equal to nine and the operation was decimal addition, no conversion would be required and a straight transfer would be desired. (Binary 0110 equals Decimal 0110.) Function DCY1, Decimal Carry, would be at ground (0 volts) in these circumstances cutting off gate 1 and gate 3; and function SUBT, Subtract, would also be low (0 volts) incapacitating gate 2, thereby driving No Binary to Decimal Conversion, NCV1, true (−5 volts).

Case 3: During subtract operations where the binary sum to be converted is a combination of four bits with value greater than nine, no conversion is required although a carry was generated. (For example: 0011 —0000 results in 0011 with a carry). The function $\overline{SUBT}$ would be ground (0 volts) cutting off gate 1; the function $\overline{BCY1}$ would be also at ground (0 volts) refusing gate 2 and 3 and the function NCV1 can go high to permit a direct transfer.

Now a review of the Accumulator Final Result functions can be made:

$$\overline{AC2}=NCV1\cdot SM2+DESB\cdot \overline{BCY1}\cdot \overline{SM2}+DEAD\ \text{(Decimal ADD)}\cdot DCY1\cdot \overline{SM2}$$

$$\overline{AC3}=NCV1\cdot SM3+DESB\cdot \overline{BCY1}\cdot SM2\cdot \overline{SM3}+DESB\cdot \overline{BCY1}\cdot \overline{SM2}\cdot SM3+DEAD\cdot SM2\cdot SM3+DEAD\cdot BCY1\cdot \overline{SM2}$$

Accordingly, any time the function no binary to decimal conversion (NCV) is activated a direct examination of the accumulator sum functions is made. If the accumulator sum SM2 is true, then the accumulator conversion for Group 2 (AC2) should be set. If, on the other hand, the accumulator sum function (SM2) is at ground, the accumulator conversion (AC2) also must be kept at ground.

Gate 2: In the case of a decimal subtract, the four bit binary configuration of 1100 or 1101 must be converted to a decimal configuration of 0010+carry or 0011 +carry. In the generation of the binary configurations, no binary carry was generated, nor was function SM2 set (−5 volts). Therefore, DESB, $\overline{BCY1}$ and $\overline{SM2}$ would be high (−5 volts) driving AC2 on (−5 volts).

Gate 3: Were the sum of two decimal digits a four bit binary configuration of 000+a decimal carry or 0001+a decimal carry, conversion to a decimal configuration of 0110+carry or 0111+carry is required. In such an add operation, function DEAD, DCY1 and $\overline{SM2}$ would be at −5 volts and turn function AC2 on.

It now will be appreciated that the illustrative example of the present invention, as disclosed in detail herebelow, essentially comprises a parallel operation arithmetic accumulator capable of both binary or decimal data processing. The normal operation of the system is in the binary mode, but when decimal operation is desired, a control flip-flop is set by the machine program to activate the decimal section of the Anticipate and Generate Carries function (AGC). It further will be appreciated that the binary section continues to remain active during the decimal mode of operation.

As explained above, if the accumulator is in the decimal mode and the sum in an accumulator exceeds ten, then a carry is forced through to the next higher accumulator group. However, the sum bits remain in binary form which, of course, is not necessarily correct for the decimal mode. If correction is required, the system logic causes the binary sum to be converted to decimal after the accumulator sum function (SM) of the apparatus. The decision to convert to decimal is a function of two factors—(1) the status of the carry, and (2) the decimal add or decimal subtract nature of the function. Accordingly, a binary to decimal conversion takes place if the system is in the decimal add mode and a carry is present, or if the system is in the decimal subtract mode and no carry is present.

The system operation will be illustrated by the following representative arithmetic examples for the binary add, binary subtract, decimal add and decimal subtract functions:

I. BINARY ADD (BAD)

| | | | |
|---|---|---|---|
| A operand | =0010 | 1101 | (45) |
| B operand | =0001 | 0111 | (23) |
| Carry | 1 | | |
| Final Result | 0100 | 0100 | (68) |

The one bit carry was set up by the Anticipate and Generate Carries function (BAC) and was added to the Accumulator Sum function (SM) to form the Accumulator Final Result (AAC).

II. BINARY SUBTRACT (BSB)

| | | | |
|---|---|---|---|
| A operand | =0010 | 1101 | (45) |
| B operand | =1110 | 1000 | (23 compl) |
| Carry 1 | 1 | 1 | |
| Final Result | 0001 | 0110 | (22) |

The carry in Group one is set up by the subtract flip-flop (SUBT) in response to a machine instruction before the operands are transferred from the operand registers to the logical AND and Exclusive OR logic. The overflow carry indicates the result is positive binary number. The carry in Group two is set up by the Anticipate and Generate carry function BAC.

III. DECIMAL ADD (DEAD)

| | | | |
|---|---|---|---|
| A operand | =0100 | 1000 | (48) |
| B operand | =0010 | 0011 | (23) |
| Carry | 1 | | |
| False Decimal Sum | 0111 | 1011 | |
| Correct Decimal Sum | 0111 | 0001 | (71) |

In this example, the carry bit in Group two is added to the A and B operands since the Group 1 bits exceed ten. The first summation resulted in a false decimal sum since the system was in decimal add and a carry out bit was present from Group one. This requires a conversion step, as explained above, to provide the correct decimal sum.

IV. DECIMAL SUBTRACT (SB)

| | | | |
|---|---|---|---|
| A operand | =0100 | 1000 | (48) |
| B operand | =1101 | 1100 | (23 compl) |
| Carry | 1 | 1 | |
| Result 1 | 0010 | 0101 | (25) |

The carry in Group one is set up by the subtract flip-flop (SUBT) in response to a machine instruction. The carry in Group two and the overflow carry are set up by the Anticipate and Generate carry functions. No conversion is required here because the system is in the decimal subtract mode and each Group propagated a carry. If no carry had been propagated from Group 1 to Group 2, then the output would require conversion to place the sum in correct decimal form. If no overflow carry was present, it would indicate an attempt to subtract a larger number from a smaller number. Suitable correction and a new operation then would be required.

While there has been shown and described a specific embodiment of the present invention, it will, of course, be understood that various modifications and alternative constructions may be made without departing from the true spirit and scope of the invention. Therefore, it is intended by the appended claims to cover all such modifications and alternative constructions as fall within their true spirit and scope.

What is claimed as the invention is:

1. In an information processing apparatus, the improvement of a data accumulator for effecting arithmetic operations comprising in combination a memory register for storing a first operand, a memory register for storing a second operand, means for simultaneously transferring said first and second operands to a network means for generating and anticipating the carry signals required for the arithmetic operation, said network means including a logical AND circuit for generating the normal carry signals required and an Exclusive OR circuit for enabling the required carry signals to be anticipated prior to the completion of the arithmetic operation, selectively programmed means for causing said network means to operate in accordance with binary or decimal arithmetic to provide a proper accumulator result, and memory register means for receiving and storing a final accumulator result of the arithmetic operation on said first and second operands as provided by said network means.

2. In an information processing apparatus, the improvement of a data accumulator for effecting arithmetic operations comprising in combination a memory register for storing a first operand, a memory register for storing a second operand, means for simultaneously transferring said first and second operands to a network means for generating and anticipating the carry signals required for the arithmetic operation, selectively programmed means for causing said network means to operate in accordance with binary or decimal arithmetic to provide a proper accumulator result, and memory register means for receiving and storing a final accumulator result of the arithmetic operation on said first and second operands as provided by said network means.

3. In an information processing apparatus, the improvement of a data accumulator for effecting arithmetic operations comprising in combination a memory register for storing a first operand, a memory register for storing a second operand, means for transferring said first and second operands in parallel to a network means including a logical AND circuit for generating the normal carry signals required for the arithmetic operation and an Exclusive OR circuit for enabling the required carry signals to be anticipated prior to the completion of the arithmetic operation, selectively programmed means for causing said network means to operate in accordance with binary or decimal arithmetic to provide a proper accumulator result, and memory register means for receiving and storing a final accumulator result of the arithmetic operation on said first and second operands as provided by said network means.

4. In an information processing apparatus, the improvement of a data accumulator for effecting arithmetic operations comprising in combination a memory register for storing a first operand, a memory register for storing a second operand, means for transferring said first and second operands in parallel to a network means for generating and anticipating the carry signals required for the arithmetic operation, said network means including logic circuits for generating the normal carry signals required and including further logic circuits for enabling the required carry signals to be anticipated prior to the completion of the arithmetic operation, selectively programmed means for causing said network means to operate in accordance with binary or decimal arithmetic to provide a proper accumulator result, and memory register means for receiving and storing a final accumulator result of the arithmetic operation on said first and second operands as provided by said network means.

5. In an information processing apparatus, the improvement of a parallel operating data accumulator for effecting arithmetic operations comprising in combination a memory register for storing a first operand, a memory register for storing a second operand, means for simultaneously transferring said first and second operands to a logic network for generating and anticipating the carry signals required for the arithmetic operation, and a logic network for performing an addition or subtraction operation upon said operands and said carry signals, selectively programmed means for causing said network means to operate in accordance with binary or decimal arithmetic to provide a proper accumulator result, and memory register means for receiving and storing a final accumulator result of the arithmetic operation on said first and second operands as provided by said network means.

6. In an information processing apparatus, the improvement of a data accumulator for effecting arithmetic operations comprising in combination a memory register for storing a first operand comprised of a plurality of bits segregated into multi-bit groups, a memory register for storing a second operand comprised of a plurality of bits segregated into multi-bit groups, means for transferring said first and second operands in parallel to a network means for generating and anticipating the carry signals required for the arithmetic operation, said network means including for each of said multi-bit groups a logical AND circuit for generating the normal carry signals required and an Exclusive OR circuit for enabling the required carry signals to be anticipated prior to the completion of the arithmetic operation, said carry signals being determined for the required carries between the bits of each multi-bit group and for the required carries between the multi-bit groups, selectively programmed means for causing said network means to operate in accordance with binary or decimal arithmetic to provide a proper accumulator result, and memory register means for receiving and storing a final accumulator result of the arithmetic operation on said first and second operands as provided by said network means.

7. In an information processing apparatus, the improvement of a data accumulator for effecting arithmetic operations comprising in combination a memory register for storing a first operand, a memory register for storing a second operand, means for simultaneously transferring said first and second operands to a network means for generating and anticipating the carry signals required for the arithmetic operation, means for summing the first and second operands together with the generated carries, selectively programmed means for causing said network means to operate in accordance with binary or decimal arithmetic to provide a proper accumulator result, and memory register means for receiving and storing a final accumulator result of the arithmetic operation on said first and second operands as provided by said network means.

8. In an information processing apparatus, the improvement of a data accumulator for effecting arithmetic operations comprising in combination a memory register for storing a first operand, a memory register for storing a second operand, means for transferring said first and second operands in parallel to a network means for generating and anticipating the carry signals required for the arithmetic operation, means for summing the first and second operands together with the generated carries, said summing means always performing an addition operation, selectively programmed means for causing said network means to operate in accordance with binary or decimal arithmetic to provide a proper accumulator result, and memory register means for receiving and storing a final accumulator result of the arithmetic operation on said first and second operands as provided by said network means.

9. In an information processing apparatus, the improvement of a data accumulator for effecting a subtraction operation comprising in combination a memory register for storing a first operand, a memory register for storing a second operand, means for transferring said first and second operands in parallel to a network means for generating and anticipating the carry signals required for the subtraction operation, means for adding the first operand and the second operand together with the generated carries, selectively programmed means for causing said network means to operate in accordance with binary or decimal arithmetic to provide a proper accumulator result, means for detecting an incorrect subtraction operation and for effecting corrections to provide a correct result, and memory register means for receiving and storing a final accumulator result of the subtraction operation on said first and second operands as provided by said network means.

10. In an information processing apparatus, the improvement of a data accumulator for effecting subtraction operations comprising in combination a memory register for storing a first multi-bit operand, a memory register for storing a second multi-bit operand, means for transferring said first and second operands in parallel to a network means for generating and anticipating the carry signals required for the subtraction operation, means for complementing one of said second operands and adding a free one bit to the low order position of said operands, means for adding said first operand, the complemented second operand, the free one bit, and the generated carries to obtain a first sum, means for detecting an incorrect subtraction and for repeating the operation by adding the first operand to the uncomplemented second operand and the generated carries to obtain a correct sum, selectively programmed means for causing said network means to operate in accordance with binary or decimal arithmetic to provide a proper accumulator result, and memory register means for receiving and storing a final accumulator result of the subtraction operation on said first and second operands as provided by said network means.

11. In an information processing apparatus, the improvement of a data accumulator for effecting parallel arithmetic operations upon a first and second operand, means for transferring said first and second operands in parallel to a network means for generating and anticipating the carry signals required for the arithmetic operation, said network means further including means for summing the operands and generated carries, selectively programmed means for causing said network means to operate in accordance with binary or decimal arithmetic to provide a proper accumulator result, and memory register means for receiving and storing a final accumulator result of the arithmetic operation on said first and second operands as provided by said network means.

12. In an information processing apparatus, the improvement of a data accumulator for effecting parallel arithmetic operations upon a first and second operand, means for transferring said first and second operands in parallel to a network means for generating and anticipating the carry signals required for the arithmetic operation, said network means including a logical AND circuit for generating the normal carry signals required and an Exclusive OR circuit for enabling the required carry signals to be anticipated prior to the completion of the arithmetic operation, and further including means for summing said operands and generated carries, and selectively programmed means for causing said network means to operate in accordance with binary or decimal arithmetic to provide a proper accumulator result.

References Cited by the Examiner

UNITED STATES PATENTS

| | | | |
|---|---|---|---|
| 3,100,835 | 8/1963 | Bendrij ------------ | 235—175 |
| 3,118,055 | 1/1964 | Bensky ------------ | 235—159 |

MALCOLM A. MORRISON, *Primary Examiner.*

ROBERT C. BAILEY, *Examiner.*

M. J. SPIVAK, *Assistant Examiner.*